US011763097B1

(12) United States Patent
Thomas et al.

(10) Patent No.: US 11,763,097 B1
(45) Date of Patent: Sep. 19, 2023

(54) INTELLIGENT DIALOGUE RECOVERY FOR VIRTUAL ASSISTANT COMMUNICATION SESSIONS

(71) Applicant: FMR LLC, Boston, MA (US)

(72) Inventors: Tito Thomas, Westford, MA (US); Allen Detmer, Patriot, IN (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/878,962

(22) Filed: Aug. 2, 2022

(51) Int. Cl.
*G06F 40/30* (2020.01)
*G06F 40/40* (2020.01)
*G06F 11/20* (2006.01)
*G10L 15/22* (2006.01)
*G10L 15/18* (2013.01)
*G10L 15/30* (2013.01)
*G06F 40/35* (2020.01)

(52) U.S. Cl.
CPC .......... *G06F 40/40* (2020.01); *G06F 11/2025* (2013.01); *G06F 40/30* (2020.01); *G10L 15/22* (2013.01); *G06F 40/35* (2020.01); *G06F 2201/86* (2013.01); *G10L 15/1815* (2013.01); *G10L 15/1822* (2013.01); *G10L 15/30* (2013.01); *G10L 2015/223* (2013.01)

(58) Field of Classification Search
None
See application file for complete search history.

(56) References Cited

U.S. PATENT DOCUMENTS

| 6,446,120 | B1 | 9/2002 | Dantressangle |
| 7,228,278 | B2 | 6/2007 | Nguyen et al. |
| 7,412,260 | B2 * | 8/2008 | Gailey .............. G06F 16/24522 704/251 |
| 9,172,747 | B2 * | 10/2015 | Walters ................... H04L 67/10 |
| 9,318,108 | B2 | 4/2016 | Gruber et al. |
| 10,109,297 | B2 | 10/2018 | Brown et al. |
| 10,127,224 | B2 | 11/2018 | Deleeuw |
| 10,185,542 | B2 | 1/2019 | Carson et al. |
| 10,276,170 | B2 | 4/2019 | Gruber et al. |
| 10,313,404 | B2 | 6/2019 | Ein-Gil et al. |

(Continued)

OTHER PUBLICATIONS

"Gathering information with slots," IBM Cloud Docs / Watson Assistant (Managed), retrieved from https://cloud.ibm.com/docs/assistant?topic=assistant-dialog-slots on Feb. 16, 2021, 12 pages.

*Primary Examiner* — Richard Z Zhu
(74) *Attorney, Agent, or Firm* — Cesari & McKenna, LLP

(57) ABSTRACT

Methods and apparatuses are described for intelligent dialogue recovery in virtual assistant communication sessions. A chat session is established between a virtual assistant (VA) and a remote device. A primary dialogue is created between the VA and the remote device, including (i) requesting from a first natural language processing (NLP) service an intent associated with user messages and (ii) waiting for a corresponding response. A secondary dialogue is created between the VA and the remote device that is synchronized to a state of the primary dialogue. When the response from the first NLP service succeeds, primary messages are generated and transmitted to the remote device in the primary dialogue. When the response from the first NLP service fails, an intent is requested from the second NLP service, and secondary messages are generated and transmitted to the remote device in the secondary dialogue.

18 Claims, 5 Drawing Sheets

(56) References Cited

U.S. PATENT DOCUMENTS

| | | |
|---|---|---|
| 10,452,695 B2 | 10/2019 | Rodgers |
| 10,453,454 B2* | 10/2019 | Homma ............... G10L 15/30 |
| 10,956,666 B2 | 3/2021 | Vescovi et al. |
| 11,379,446 B1 | 7/2022 | Detmer et al. |
| 11,609,941 B2* | 3/2023 | Folland ............... G06F 21/6236 |
| 2002/0032591 A1* | 3/2002 | Mahaffy ............... G10L 13/00 |
| | | 706/45 |
| 2003/0132958 A1 | 7/2003 | Himmel et al. |
| 2004/0218751 A1* | 11/2004 | Colson ............... H04M 3/51 |
| | | 379/265.09 |
| 2012/0041903 A1 | 2/2012 | Beilby et al. |
| 2014/0279050 A1 | 9/2014 | Makar et al. |
| 2016/0042735 A1* | 2/2016 | Vibbert ............... G10L 15/1822 |
| | | 704/257 |
| 2017/0148073 A1 | 5/2017 | Nomula et al. |
| 2017/0324867 A1 | 11/2017 | Tamblyn et al. |
| 2018/0025726 A1 | 1/2018 | Gatti de Bayser et al. |
| 2018/0131643 A1 | 5/2018 | Trufinescu et al. |
| 2018/0293983 A1* | 10/2018 | Choi ............... G10L 15/1815 |
| 2018/0337872 A1 | 11/2018 | Fawcett |
| 2019/0089655 A1 | 3/2019 | Uppala et al. |
| 2019/0095524 A1 | 3/2019 | Rodgers |
| 2019/0172454 A1 | 6/2019 | Kitajima et al. |
| 2019/0188590 A1 | 6/2019 | Wu et al. |
| 2019/0258456 A1 | 8/2019 | Byun et al. |
| 2019/0311036 A1 | 10/2019 | Shanmugam et al. |
| 2019/0311713 A1* | 10/2019 | Talwar ............... G06F 40/30 |
| 2020/0007380 A1 | 1/2020 | Chen et al. |
| 2020/0081939 A1 | 3/2020 | Subramaniam |
| 2020/0175118 A1* | 6/2020 | Mahajan ............... G10L 17/22 |
| 2020/0273089 A1* | 8/2020 | Siefken ............... G06Q 50/12 |
| 2020/0320984 A1* | 10/2020 | Kuczmarski ........... G06N 20/00 |
| 2020/0364300 A1 | 11/2020 | Tan et al. |
| 2020/0372055 A1 | 11/2020 | Joko et al. |
| 2021/0004390 A1 | 1/2021 | Li et al. |
| 2021/0142009 A1 | 5/2021 | Detmer et al. |
| 2022/0050751 A1 | 2/2022 | Hazra et al. |

* cited by examiner

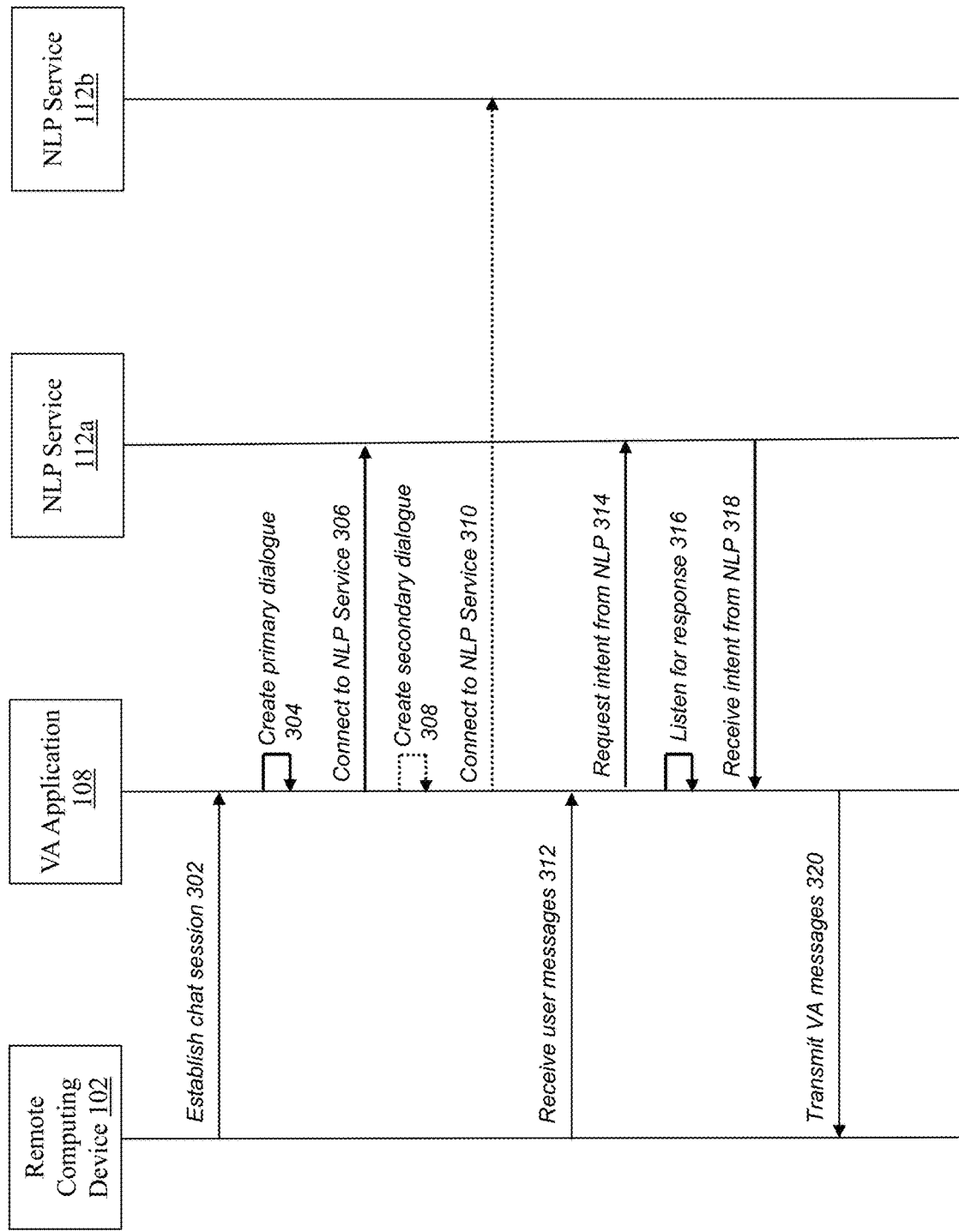

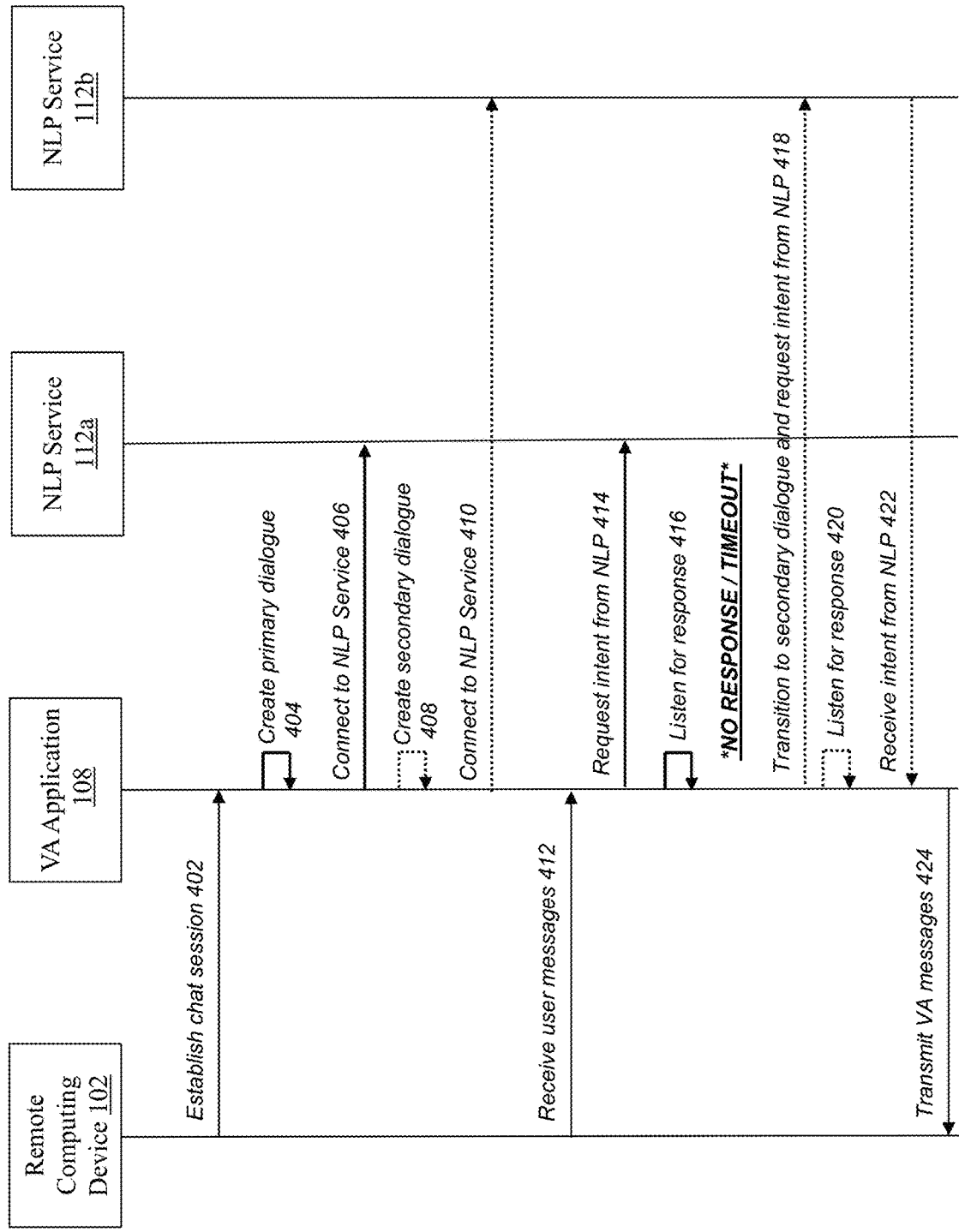

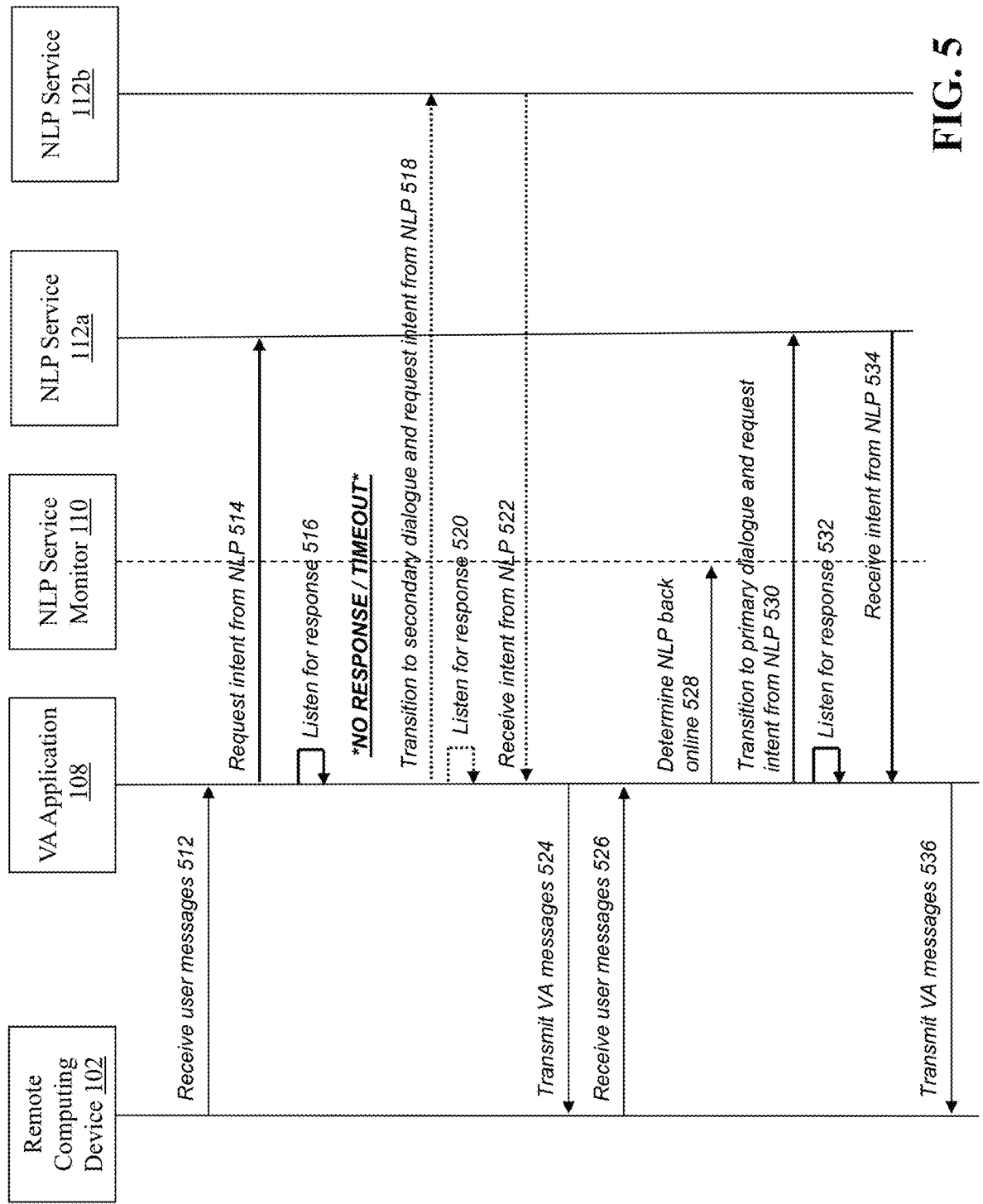

US 11,763,097 B1

INTELLIGENT DIALOGUE RECOVERY FOR VIRTUAL ASSISTANT COMMUNICATION SESSIONS

TECHNICAL FIELD

This application relates generally to methods and apparatuses, including computer program products, for intelligent dialogue recovery for virtual assistant communication sessions.

BACKGROUND

As computing technology has become commonplace, many users have abandoned the use of live telephone conversations with service agents and representatives to answer questions and resolve issues, in favor of electronic communications such as text-based online chat sessions over the Internet involving the use of computing devices and related chat-based software. To efficiently manage this form of communication, many organizations are turning to automated conversation service software applications (such as virtual assistants (VAs) and chatbots) to interact with end users intelligently using advanced language processing and data interpretation technology. One such technology is the use of a natural language processing (NLP) service that interprets messages coming from an end user in order to determine the user's intent, so that the virtual assistant software can respond in a way that meets the end user's needs or goals. Many times, a conversation service software application can resolve the end user's inquiry quickly and efficiently, which reduces cost for the organization and increases satisfaction of the end user.

Because a VA is typically the first point of interaction with an end user, availability and scalability of VAs and related NLP services is essential. When end users cannot get service using the VA, it results in an increase in interaction volume to live agent call centers, which in turn increases hold times and undermines end user trust in the VA.

A deficiency of existing virtual assistant software lies in the fact that every VA or chatbot is directly mapped with one NLP service for determining the response(s) to the end user's messages. This one-to-one mapping creates a single point of dependency in the NLP service and causes a significant bottleneck if the NLP service is down or otherwise fails to respond to a VA request in a sufficiently timely manner.

SUMMARY

Therefore, what is needed are methods and systems that provide for intelligent failover and recovery of conversations in virtual assistant communication sessions. The dialogue recovery techniques described herein advantageously keep a secondary dialogue in the conversation flow between a VA and an end user which acts as a fallback when the primary dialogue/NLP service takes time to respond, or a call to the NLP service fails. In some embodiments, the VA is configured to track an elapsed response time of the primary dialogue and when the elapsed time exceeds a predetermined threshold, the VA proactively transitions to a secondary dialogue that is configured to connect with a secondary NLP service to respond to the end user's request.

As can be appreciated, the methods and systems described herein gracefully degrade the performance of the primary dialogue when, e.g., a pattern of failure in the primary dialogue calls is detected. In such scenarios, the VA dynamically switches over to the secondary dialogue and the secondary dialogue is considered as the 'primary' dialogue from that point forward in the conversation flow. Concurrently, the VA attempts to connect to the failed primary dialogue at regular intervals and once the NLP service for the primary dialogue is back online, the VA can switch back to the primary dialogue. As a result, the efficiency and availability of the VA is greatly increased. In addition, the user experience is vastly improved because the automatic transition ensures that the user does not see any change to the conversation flow or is otherwise interrupted with error messages or conversation delays.

The invention, in one aspect, features a computer system for intelligent dialogue recovery in virtual assistant communication sessions. The system comprises a computing device having a memory that stores computer-executable instructions and a processor that executes the computer-executable instructions. The computing device establishes a chat-based communication session between a virtual assistant application of the computing device and a remote computing device. The computing device creates a primary dialogue between the virtual assistant application and the remote computing device, including (i) requesting from a first natural language processing (NLP) service an intent associated with one or more user messages received from the remote computing device and (ii) waiting for a corresponding response that includes the requested intent from the first NLP service. The computing device creates a secondary dialogue between the virtual assistant application and the remote computing device that is synchronized to a state of the primary dialogue, including connecting to a second NLP service. When the response from the first NLP service succeeds, the computing device generates one or more primary virtual assistant messages based upon the intent requested from the first NLP service and transmits the one or more primary virtual assistant messages to the remote computing device in the primary dialogue. When the response from the first NLP service fails, the computing device requests an intent from the second NLP service, generates one or more secondary virtual assistant messages based upon the intent requested from the second NLP service, and transmits the one or more secondary virtual assistant messages to the remote computing device in the secondary dialogue.

The invention, in another aspect, features a computerized method of intelligent dialogue recovery in virtual assistant communication sessions. A computing device establishes a chat-based communication session between a virtual assistant application of the computing device and a remote computing device. The computing device creates a primary dialogue between the virtual assistant application and the remote computing device, including (i) requesting from a first natural language processing (NLP) service an intent associated with one or more user messages received from the remote computing device and (ii) waiting for a corresponding response that includes the requested intent from the first NLP service. The computing device creates a secondary dialogue between the virtual assistant application and the remote computing device that is synchronized to a state of the primary dialogue, including connecting to a second NLP service. When the response from the first NLP service succeeds, the computing device generates one or more primary virtual assistant messages based upon the intent received from the first NLP service and transmits the one or more primary virtual assistant messages to the remote computing device in the primary dialogue. When the response from the first NLP service fails, the computing device requests an intent from the second NLP service, generates one or more secondary virtual assistant messages based upon the intent requested from the second NLP service, and transmits the one or more secondary virtual assistant messages to the remote computing device in the secondary dialogue.

Any of the above aspects can include one or more of the following features. In some embodiments, the response from the first NLP service fails when the response is not received from the first NLP service within a predetermined time limit or when the first NLP service returns an error. In some embodiments, the computing device captures a first timestamp associated with transmission of the request to the first NLP service and periodically determines an elapsed time based upon the first timestamp. In some embodiments, the computing device determines that the response from the first NLP service fails when the elapsed time exceeds the predetermined time limit.

In some embodiments, when the response from the first NLP service fails, the virtual assistant application transitions from the primary dialogue to the secondary dialogue in the chat-based communication session before transmitting the one or more secondary virtual assistant messages to the remote computing device. In some embodiments, after the transition has occurred, the computing device determines that the first NLP service is responsive and the virtual assistant application transitions from the secondary dialogue to the primary dialogue in the chat-based communication session prior to transmitting one or more subsequent virtual assistant messages to the remote computing device. In some embodiments, the computing device determines that the first NLP service is responsive through a periodic connectivity check.

In some embodiments, the transition from the primary dialogue to the secondary dialogue occurs without providing an indication of the transition to the remote computing device. In some embodiments, the first dialogue and the second dialogue each comprises a conversation flow between the virtual assistant application and a user of the remote computing device.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3 is a workflow diagram of a method for determining user intent in a primary dialogue during a virtual assistant communication session.

FIG. 4 is a workflow diagram of a method for transitioning to a secondary dialogue during a virtual assistant communication session and determining user intent in the secondary dialogue.

FIG. 5 is a workflow diagram of a method for transitioning back to the primary dialogue during a virtual assistant communication session.

DETAILED DESCRIPTION

Figure 1:
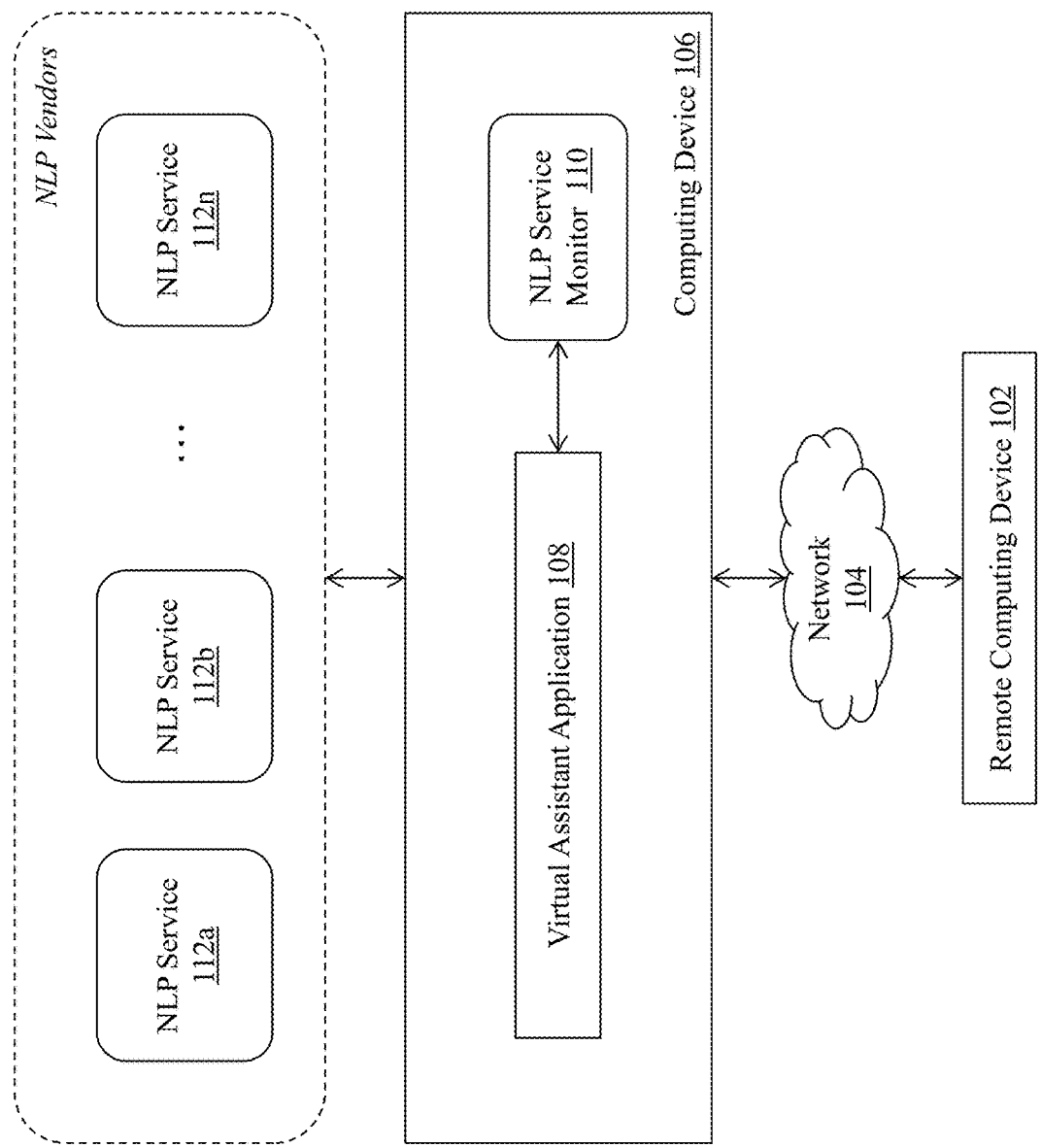
FIG. 1 is a block diagram of a system for intelligent dialogue recovery in virtual assistant communication sessions.

FIG. 1 is a block diagram of a system 100 for intelligent dialogue recovery in virtual assistant communication sessions. System 100 includes remote computing device 102, a communications network 104, computing device 106 that includes a virtual assistant (VA) application 108 and a natural language processing (NLP) service monitor 110, and a plurality of NLP services 112a-112n.

Remote computing device 102 connects to one or more communications networks (e.g., network 104) in order to communicate with computing device 106 to provide input and receive output relating to one or more chat-based communication sessions as described herein. Exemplary remote computing devices 102 include but are not limited to server computing devices, desktop computers, laptop computers, tablets, mobile devices, smartphones, and the like. It should be appreciated that other types of computing devices that are capable of connecting to the components of the system 100 can be used without departing from the scope of invention. Although FIG. 1 depicts one remote computing device 102, it should be appreciated that system 100 can include any number of remote computing devices. In some embodiments, remote computing device 102 is configured with chat application software, which enables remote computing device 102 to establish a chat-based communication session with the computing device 106 via virtual assistant application 108 of computing device 106.

Communications network 104 enables remote computing device 102 to communicate with computing device 106. Network 104 is typically comprised of one or more wide area networks, such as the Internet and/or a cellular network, and/or local area networks. In some embodiments, network 104 is comprised of several discrete networks and/or sub-networks (e.g., cellular to Internet).

Computing device 106 is a device including specialized hardware and/or software modules that execute on a processor and interact with memory modules of computing device 106, to receive data from other components of system 100, transmit data to other components of system 100, and perform functions for intelligent dialogue recovery in virtual assistant communication sessions as described herein. Exemplary computing devices 106 include but are not limited to desktop computers, laptop computers, tablets, mobile devices, smartphones, and the like. Computing device 106 includes a virtual assistant application and a NLP service monitor 110 that execute on one or more processors of computing device 106. In some embodiments, VA application 108 and NLP service monitor 110 are specialized sets of computer software instructions programmed onto one or more dedicated processors in computing device 106.

As can be appreciated, in some embodiments virtual assistant application 108 comprises a conversation service software application (i.e. chatbot) configured to automatically interact with a user at remote computing device 102 in order to gather information and/or respond to inquiries. An exemplary conversation service application can be based upon a natural language processing (NLP) architecture using one or more NLP services 112a-112n which intelligently parse text messages received from remote computing devices to understand the context of the message(s) (also called the intent) and how to best respond to it. In some embodiments, VA application 108 can establish a chat-based communication session with remote computing device 102 to enable the user at remote computing device 102 to participate in an automated chat session with VA application 108. In these embodiments, VA application 108 provides the chat interface for the exchange of messages with remote computing device 102.

In some embodiments, remote computing device 102 includes an application that executes on remote computing device 102 to provide certain functionality to a user of remote computing device. In some embodiments, remote computing device 102 can include a native application installed locally on remote computing device 102. For example, a native application is a software application (also called an 'app') that written with programmatic code designed to interact with an operating system that is native to remote computing device 102 and provide information and application functionality (such as a chatbot interface) to a user of remote computing device 102. In the example where remote computing device 102 is a mobile device such as a smartphone, the native application software is available for download from, e.g., the Apple® App Store or the Google® Play Store. In some embodiments, the native application includes a software development kit (SDK) module that is executed by a processor of remote computing device 102. In other embodiments, remote computing device 102 can include a browser application that runs on the remote computing device 102 and connects to one or more other computing devices (e.g., computing device 106) for retrieval and display of information and application functionality (such as conducting a virtual assistant communication session with VA application 108). In one example, the browser application enables remote computing device 102 to communicate via HTTP or HTTPS with computing device 106 (e.g., via a URL) to receive website-related content, including one or more webpages, for rendering in the browser application and presentation on a display device coupled to remote computing device 102. Exemplary browser application software includes, but is not limited to, Firefox™, Chrome™ Safari™, and other similar software. The one or more webpages can comprise visual and audio content for display to and interaction with a user.

NLP service monitor 110 comprises a specialized hardware and/or software module module (e.g., firmware, middleware, etc.) which executes on one or more processors of computing device 106 for the purpose of monitoring availability, uptime, connectivity, and other network or service-level attributes of one or more NLP services 112a-112n. In some embodiments, NLP service monitor 110 is configured to periodically connect to each of the NLP services 112a-112n to determine whether the NLP services 112a-112n are available and communicating properly with computing device 106. For example, NLP service monitor 110 can utilize a scheduler to make a call to each NLP service 112a-112n on a rotating basis and listen for a corresponding response to the call. When no response is received within a predetermined time limit, or when an error messages is returned by an NLP service (e.g., service 112b), NLP service monitor 110 can inform VA application 108 that the corresponding NLP service 112b is unavailable. After a period of time, NLP service 112b may return to normal operating status. When NLP service monitor 110 subsequently calls NLP 112b service and receives a successful response, NLP service monitor 110 can inform VA application 108 that service 112b is back online and available for use.

Although VA application 108 and NLP service monitor 110 are shown in FIG. 1 as executing within the same computing device 106, in some embodiments the functionality of VA application 108 and NLP service monitor 110 can be distributed among one or a plurality of other computing devices that are coupled to computing device 106. As shown in FIG. 1, the computing device 106 enables VA application 108 and NLP service monitor 110 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The functionality of VA application 108 and NLP service monitor 110 will be described in greater detail throughout this specification.

NLP services 112a-112n each comprises a computing resource that is configured to analyze incoming user messages (e.g., messages received from remote computing device 102 as part of a virtual assistant communication session with VA application 108) and provide a determined intent associated with the user message(s). As can be appreciated, a main goal of many virtual assistant applications is to parse incoming user messages, process the messages using a NLP module to understand the user's input and to determine a user intent for the messages. Then, based upon the determined user intent, the virtual assistant formulates a response to the user messages (e.g., provides information, answers a question, initiates a transaction, etc.) that satisfies the user intent and continues the conversation flow. In some embodiments, NLP services 112a-112n can be application programming interfaces (APIs) that are called by VA application 108 using one or more function calls including parameters such as the user messages. It should be appreciated that NLP services 112a-112n can be located on computing device 106 and/or one or more computing devices that are separate from computing device 106 (e.g., service endpoints, remote servers and the like). Exemplary NLP services 112a-112n include but are not limited to Google® Dialogflow™, Amazon® Lex™, and Microsoft® Azure Bot™.

Figure 2:
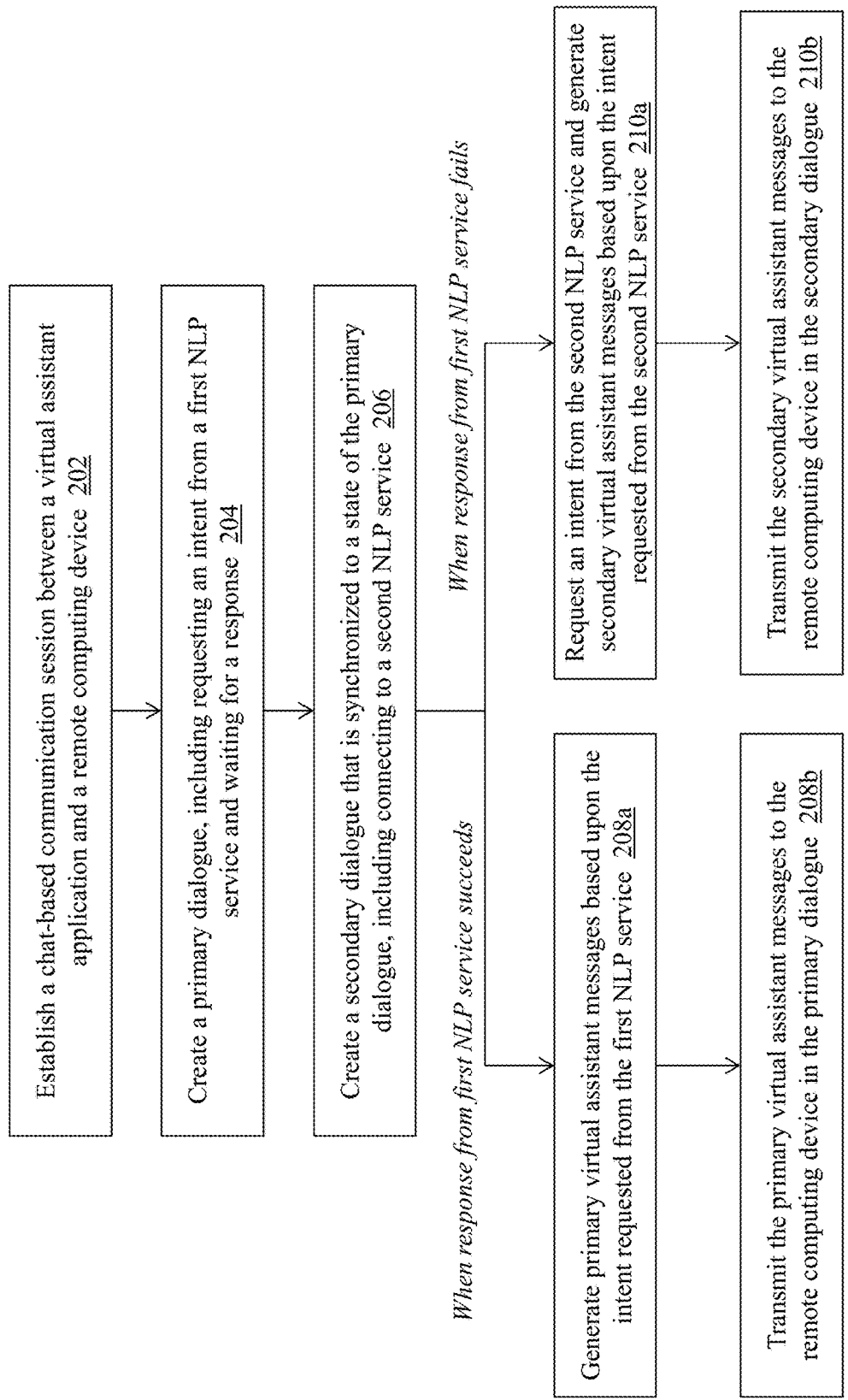
FIG. 2 is a flow diagram of a computerized method of intelligent dialogue recovery in virtual assistant communication sessions.

FIG. 2 is a flow diagram of a computerized method 200 of intelligent dialogue recovery in virtual assistant communication sessions, using system 100 of FIG. 1. A user at remote computing device 102 can launch an application (e.g., app, browser) to perform a variety of tasks, including but not limited to information retrieval from local and/or remote data sources. For example, when the application is a browser application, the user can interact with the application to access one or more websites and/or webpages (either internally or externally hosted) in order to view information and submit queries for retrieval of additional information. In one embodiment, the user of remote computing device 102 is a customer accessing a company website to retrieve information (e.g., product information, account information, customer service information, and the like).

As can be appreciated, in some instances the information that the customer is seeking may not be readily available or the customer may have additional questions that he or she cannot resolve using only the information provided by the application. In these instances, the customer may want to conduct a chat-based communication session with computing device 106 via the virtual assistant application 108. For example, a customer at remote computing device 102 may want to connect to VA application 108 for real-time, automated assistance in resolving a problem, performing a transaction, or answering a question. The customer at device 102 can launch an app or a browser to initiate a network connection (e.g., HTTP) to VA application 108 on computing device 106.

Computing device 106 establishes (step 202) a chat-based communication session with remote computing device 102 via virtual assistant application 108. When the session is established, computing device 106 can transmit one or more VA messages to remote computing device that greet the user and ask the user how the VA application 108 can help. The user at remote computing device 102 can submit one or more user messages that relate to the purpose for initiating the chat-based communication session. VA application 108 receives the user messages and creates (step 204) a primary dialogue in the communication session between VA application 108 and remote computing device 102. As can be appreciated, a dialogue typically corresponds to a state-based conversation flow between remote computing device 102 and VA application 108, where VA application utilizes an NLP service 110a-110n to parse the user messages and determine an intent behind the user messages so that VA application 108 can respond appropriately and perform specific functions (e.g., information retrieval, transaction processing) as necessary. The primary dialogue is used by VA application 108 to manage the conversation flow and coordinate with a particular NLP service (e.g., service 112a) to interpret the incoming user messages and determine user intent. Creation of the primary dialogue also includes (i) requesting from the NLP service 112a an intent associated with one or more user messages received from remote computing device 102 and (ii) waiting for a corresponding response that includes the requested intent from the first NLP service 112a.

VA application 108 also creates (step 206) a secondary dialogue in the communication session between VA application 108 and remote computing device 102. In some embodiments, the secondary dialogue is configured as a failover dialogue in the event that the primary dialogue fails to respond to a user message. VA application 108 maintains the secondary dialogue with the same state and conversation flow as the primary dialogue and connects the secondary dialogue to a different NLP service (e.g., service 112b) than the primary dialogue. However, VA application 108 does not process incoming user messages or return responses to the messages in the secondary dialogue when the primary dialogue is actively receiving, processing and responding to user messages.

As mentioned above, an NLP service provider may experience connection issues, processing slowdowns, software errors, hardware failures, or other technical problems that impact the availability and responsiveness of the corresponding NLP service 112a. In these circumstances, the primary dialogue attempts to connect to NLP service 112a but due to the above-referenced problems, the primary dialogue does not receive a response, receives an error message, etc. Instead of simply providing the user at remote computing device 102 with a generic error message (such as directing the user to call a customer service number or click a link to report a problem) and ending the chat session, VA application 108 can instead automatically transition to the secondary dialogue (which has maintained the same state and conversation flow as the primary dialogue) and continue the chat session uninterrupted while using another NLP service 112b. Beneficially, the user at remote computing device 102 is not even aware that the transition has occurred—producing a seamless and satisfactory user experience.

Continuing with FIG. 2, when the response from the first NLP service 112a succeeds, VA application 108 generates (step 208a) one or more primary virtual assistant messages based upon the intent requested from the first NLP service 112a. In some embodiments, the response from the first NLP service 112a can include text, hyperlinks, and other data that is responsive to the user messages in addition to the determined user intent, and VA application 108 can generate messages for insertion into the primary dialogue and transmission to remote computing device 102. In some embodiments, the response from the first NLP service 112a can include the determined user intent and VA application 108 can access one or more other resources (e.g., database(s), server computing devices, etc.) to retrieve information associated with the user intent for generation of VA messages by application 108. VA application then transmits (step 208b) the primary virtual assistant messages to remote computing device 102 in the primary dialogue. As can be appreciated, throughout this process VA application 108 maintains the secondary dialogue by, e.g., synchronizing a state of the secondary dialogue to a state of the primary dialogue as messages are exchanged between application 108 and remote computing device 102.

When the response from the first NLP service 112a fails, VA application 108 requests (step 210a) an intent from the second NLP service 112b based upon the one or more user messages and generates secondary virtual assistant messages based upon the intent requested from the second NLP service 112b. As mentioned above, the response from the first NLP service 112a can fail for any of a number of different reasons—e.g., network connectivity issues, processing slowdowns, hardware failures, and so forth. VA application 108 (alone or in conjunction with NLP service monitor 110) can determine that the response from the first NLP service 112a has failed and automatically transition to the secondary dialogue for uninterrupted continuation of the chat session with remote computing device 102. Once the transition is complete, VA application 108 generates one or more secondary virtual assistant messages based upon the intent requested from the second NLP service 112g. VA application 108 transmits (step 210b) the secondary virtual assistant messages to remote computing device 102 in the secondary dialogue. Because VA application 108 had been maintaining the secondary dialogue with a state that is synchronized to the state of the primary dialogue, the user at remote computing device 102 is not required to start the chat session over or repeat any messages; instead, the conversation with VA application 108 simply continues from the state at which the primary dialogue failed and the user is unaware of any problems that may be occurring with the first NLP service 112a.

FIGS. 3-5 are workflow diagrams of computerized methods for intelligent dialogue recovery in virtual assistant communication sessions, using system 100 of FIG. 1. FIG. 3 is a workflow diagram of a method 300 for determining user intent in a primary dialogue during a virtual assistant communication session. As shown in FIG. 3, remote computing device 102 establishes (302) a chat-based communication session with VA application 108. VA application 108 creates (304) a primary dialogue for the chat session and connects (306) to NLP service 112a for determining the intent of the user at remote computing device 102. VA application 108 creates (308) a secondary dialogue for the chat session that is synchronized to a state of the primary dialogue and connects (310) to NLP service 112b. In some embodiments, VA application 108 creates the primary dialogue and the secondary dialogue at the same time during creation of the communication session with remote computing device 102. In some embodiments, VA application 108 creates the primary dialogue before creating the secondary dialogue.

During the conversation between the user of remote computing device 102 and VA application 108, the user submits one or more user messages to VA application 108 and VA application receives (312) the user messages. Next, VA application 108 requests (314) an intent associated with the user messages from NLP service 112a—for example, application 108 transmits the one or more user messages to NLP service 112a, which processes the messages and determines a user intent corresponding to the messages. NLP service 112a can determine a content and context of the user messages and map the content/context to one or more preconfigured user intents that relate to a purpose for the interaction or need of the user. While NLP service 112a is determining the user intent, VA application 108 listens (316) for a response from NLP service 112a. In some embodiments, VA application 108 can capture a timestamp corresponding to a time when the request was transmitted to NLP service 112a and periodically determine an elapsed time based upon the timestamp. When the response including the determined intent is received (318) at VA application from NLP service 112a, VA application generates and transmits (320) VA messages back to remote computing device 102 to continue the conversation with the user. It should be appreciated that, during this process the state of the primary dialogue changes as messages are exchanged. VA application 108 continually synchronizes the state of the secondary dialogue with the state of the primary dialogue to ensure that the secondary dialogue can seamlessly intervene in the conversation flow if necessary.

FIG. 4 is a workflow diagram of a method 400 for transitioning to a secondary dialogue during a virtual assistant communication session and determining user intent in the secondary dialogue. As shown in FIG. 4, remote computing device 102 establishes (402) a chat-based communication session with VA application 108. VA application 108 creates (404) a primary dialogue for the chat session and connects (406) to NLP service 112a for determining the intent of the user at remote computing device 102. VA application 108 creates (408) a secondary dialogue for the chat session that is synchronized to a state of the primary dialogue and connects (410) to NLP service 112b. During the conversation between the user of remote computing device 102 and VA application 108, the user submits one or more user messages to VA application 108 and VA application receives (412) the user messages. Next, VA application 108 requests (414) an intent associated with the user messages from NLP service 112a and listens (416) for a response from NLP service 112a.

However, in this workflow, VA application 108 determines that the response from NLP service 112a has failed (e.g., no response received within a predetermined time limit, error message received, etc.). In some embodiments, VA application 108 determines that the response has failed by querying NLP service monitor 110 for information about the status of NLP service 112a. For example, NLP service monitor 110 can periodically perform a connectivity check with each of the NLP services 112a-112n used by VA application 108. For services where the connectivity check results in an error (indicating that the corresponding service is not operational), NLP service monitor 110 can record the outage status in a data record. When VA application 108 prepares to request an intent from NLP service 112a, VA application 108 queries the outage data records maintained by NLP service monitor 110 and determines that NLP service 112 is experiencing a technical problem.

VA application 108 automatically transitions (418) to the secondary dialogue and requests an intent from NLP service 112b using the one or more messages received in step 412. VA application listens (420) for a response from NLP service 112b, and upon receiving (422) the intent from NLP service 112b, VA application 108 generates and transmits (424) one or more VA messages to remote computing device 102, thereby continuing the conversation flow with the user of remote computing device via the secondary dialogue.

FIG. 5 is a workflow diagram of a method 500 for transitioning back to the primary dialogue during a virtual assistant communication session. Although not shown in FIG. 5, it should be understood that this method 500 includes the steps of establishing a chat session, and creating the primary dialogue and the secondary dialogue. During the conversation between the user of remote computing device 102 and VA application 108, the user submits one or more user messages to VA application 108 and VA application receives (512) the user messages. Next, VA application 108 requests (514) an intent associated with the user messages from NLP service 112a and listens (516) for a response from NLP service 112a. VA application 108 determines that the response from NLP service 112a has failed (e.g., no response received within a predetermined time limit, error message received, etc.), automatically transitions (518) to the secondary dialogue and requests an intent from NLP service 112b using the one or more messages received in step 412. VA application listens (520) for a response from NLP service 112b, and upon receiving (522) the intent from NLP service 112b, VA application 108 generates and transmits (524) one or more VA messages to remote computing device 102, thereby continuing the conversation flow with the user of remote computing device via the secondary dialogue. It should be appreciated that during use of the secondary dialogue, VA application 108 synchronizes the state of the secondary dialogue with the state of the primary dialogue, to ensure that the two dialogues maintain the same state.

As noted above, at some point during the chat session NLP service 112a may come back online and be available to receive requests from VA application 108. NLP service monitor 110 can determine (528) that the status of NLP service 112a has returned to normal and VA application 108 automatically transitions (530) back to the primary dialogue and requests an intent from NLP service 112a using the messages received in step 526. VA application 108 listens (532) for a response from NLP service 112a and when the response is received (534), VA application generates and transmits (536) one or more VA messages to remote computing device 102 to continue the conversation flow with the user of remote computing device 102.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer system for intelligent dialogue recovery in virtual assistant communication sessions, the system comprising a computing device having a memory that stores computer-executable instructions and a processor that executes the computer-executable instructions to:
    establish a chat-based communication session between a virtual assistant application of the computing device and a remote computing device;
    create a primary dialogue between the virtual assistant application and the remote computing device, including (i) requesting from a first natural language processing (NLP) service an intent associated with one or more user messages received from the remote computing device and (ii) waiting for a corresponding response that includes the requested intent from the first NLP service;
    create a secondary dialogue between the virtual assistant application and the remote computing device that is synchronized to a state of the primary dialogue, including connecting to a second NLP service;
    when the response from the first NLP service succeeds, generate one or more primary virtual assistant messages based upon the intent requested from the first NLP service and transmit the one or more primary virtual assistant messages to the remote computing device in the primary dialogue; and
    when the response from the first NLP service fails, request an intent from the second NLP service, generate one or more secondary virtual assistant messages based upon the intent requested from the second NLP service, and transmit the one or more secondary virtual assistant messages to the remote computing device in the secondary dialogue.

2. The system of claim 1, wherein the response from the first NLP service fails when the response is not received from the first NLP service within a predetermined time limit or when the first NLP service returns an error.

3. The system of claim 2, wherein the computing device captures a first timestamp associated with transmission of the request to the first NLP service and periodically determines an elapsed time based upon the first timestamp.

4. The system of claim 3, wherein the computing device determines that the response from the first NLP service fails when the elapsed time exceeds the predetermined time limit.

5. The system of claim 2, wherein when the response from the first NLP service fails, the virtual assistant application transitions from the primary dialogue to the secondary dialogue in the chat-based communication session before transmitting the one or more secondary virtual assistant messages to the remote computing device.

6. The system of claim 5, wherein after the transition has occurred, the computing device determines that the first NLP service is responsive and the virtual assistant application transitions from the secondary dialogue to the primary dialogue in the chat-based communication session prior to transmitting one or more subsequent virtual assistant messages to the remote computing device.

7. The system of claim 6, wherein the computing device determines that the first NLP service is responsive through a periodic connectivity check.

8. The system of claim 5, wherein the transition from the primary dialogue to the secondary dialogue occurs without providing an indication of the transition to the remote computing device.

9. The system of claim 1, wherein the first dialogue and the second dialogue each comprises a conversation flow between the virtual assistant application and a user of the remote computing device.

10. A computerized method of intelligent dialogue recovery in virtual assistant communication sessions, the method comprising:
    establishing, by a computing device, a chat-based communication session between a virtual assistant application of the computing device and a remote computing device;
    creating, by the computing device, a primary dialogue between the virtual assistant application and the remote computing device, including (i) requesting from a first natural language processing (NLP) service an intent associated with one or more user messages received from the remote computing device and (ii) waiting for a corresponding response that includes the requested intent from the first NLP service;
    creating, by the computing device, a secondary dialogue between the virtual assistant application and the remote computing device that is synchronized to a state of the primary dialogue, including connecting to a second NLP service;
    when the response from the first NLP service succeeds, generating, by the computing device, one or more primary virtual assistant messages based upon the intent requested from the first NLP service and transmitting the one or more primary virtual assistant messages to the remote computing device in the primary dialogue; and
    when the response from the first NLP service fails, requesting, by the computing device, an intent from the second NLP service, generating one or more secondary virtual assistant messages based upon the intent requested from the second NLP service, and transmitting the one or more secondary virtual assistant messages to the remote computing device in the secondary dialogue.

11. The method of claim 10, wherein the response from the first NLP service fails when the response is not received from the first NLP service within a predetermined time limit or when the first NLP service returns an error.

12. The method of claim 11, further comprising capturing, by the computing device, a first timestamp associated with transmission of the request to the first NLP service and periodically determining an elapsed time based upon the first timestamp.

13. The method of claim 12, further comprising determining, by the computing device, that the response from the first NLP service fails when the elapsed time exceeds the predetermined time limit.

14. The method of claim 11, wherein when the response from the first NLP service fails, the virtual assistant application transitions from the primary dialogue to the secondary dialogue in the chat-based communication session before transmitting the one or more secondary virtual assistant messages to the remote computing device.

15. The method of claim 14, wherein after the transition has occurred, the computing device determines that the first NLP service is responsive and the virtual assistant application transitions from the secondary dialogue to the primary dialogue in the chat-based communication session prior to transmitting one or more subsequent virtual assistant messages to the remote computing device.

16. The method of claim 15, further comprising determining, by the computing device, that the first NLP service is responsive through a periodic connectivity check.

17. The method of claim 14, wherein the transition from the primary dialogue to the secondary dialogue occurs without providing an indication of the transition to the remote computing device.

18. The method of claim 10, wherein the first dialogue and the second dialogue each comprises a conversation flow between the virtual assistant application and a user of the remote computing device.

\* \* \* \* \*